United States Patent
Fender et al.

(10) Patent No.: US 11,061,901 B2
(45) Date of Patent: Jul. 13, 2021

(54) INFLUENCING PLAN GENERATION IN THE CONTEXT OF THE TWO PHASE QUERY OPTIMIZATION APPROACH

(71) Applicant: Oracle International Corporation, Redwood Shores, CA (US)

(72) Inventors: Pit Fender, Union City, CA (US); Benjamin Schlegel, Merced, CA (US); Nipun Agarwal, Saratoga, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 38 days.

(21) Appl. No.: 16/519,794

(22) Filed: Jul. 23, 2019

(65) Prior Publication Data

US 2021/0026855 A1  Jan. 28, 2021

(51) Int. Cl.
  *G06F 16/245* (2019.01)
  *G06F 16/2453* (2019.01)
(52) U.S. Cl.
  CPC .. *G06F 16/24544* (2019.01); *G06F 16/24537* (2019.01); *G06F 16/24545* (2019.01)
(58) Field of Classification Search
  None
  See application file for complete search history.

(56) References Cited

U.S. PATENT DOCUMENTS

| 6,377,943 | B1 * | 4/2002 | Jakobsson | G06F 16/24545 |
| 2007/0174292 | A1 * | 7/2007 | Li | G06F 16/24539 |
| 2007/0185912 | A1 * | 8/2007 | Gupta | G06F 16/2462 |
| 2018/0157710 | A1 * | 6/2018 | Guirguis | G06F 16/27 |
| 2019/0102346 | A1 | 4/2019 | Wang et al. | |
| 2019/0121891 | A1 * | 4/2019 | Fender | G06F 16/24545 |
| 2020/0394191 | A1 | 12/2020 | Fender | |
| 2020/0394192 | A1 | 12/2020 | Fender | |

OTHER PUBLICATIONS

Palkar, et al., "Filter Before You Parse: Faster Analytics on Raw Data with Sparser", Proceedings of the VLDB Endowment, vol. 11, No. 11, dated 2018, 14 pages.

Mustard et al., "JumpGate: Towards In-Network Data Processing", dated 2019, 3 pages.

(Continued)

*Primary Examiner* — Son T Hoang
(74) *Attorney, Agent, or Firm* — Hickman Becker Bingham Ledesma LLP; Jeffrey R. Madrak (57) ABSTRACT

Techniques are described herein for influencing plan generation in context of the two phase query optimization approach. Types of pruning criteria including method pruning criteria, total cost pruning criteria, and permutation pruning criteria exist in cost-based plan generators to determine what parts of a query statement should be offloaded to a query offload engine. Method pruning criteria is responsible to determine an optimal joining method. Total cost pruning criteria compares accumulated costs with a lowest plan cost determined so far. Permutation pruning criteria is responsible for selecting the cheapest query execution plan from all considered query execution plans. Each type of pruning criteria is modified to favor offload engine execution upon request.

20 Claims, 5 Drawing Sheets

(56) References Cited

OTHER PUBLICATIONS

Kornacker et al., "Impala: A Modern, Open-Source SQL Engine for Hadoop", 7th Biennial Conference on Innovative Data Systems Research (CIDR'15) dated Jan. 4-7, 2015, 10 pages.
Balkesen et al., "RAPID: In-Memory Analytical Query Processing Engine with Extreme Performance perWatt", SIGMOD'18, Jun. 10-15, 2018, Houston, TX, USA, 13 pages.
Agrawal et al., "A Many-core Architecture for In-Memory Data Processing", MICRO-50, Oct. 14-18, 2017, Cambridge, MA, USA, 14 pages.
Fender, U.S. Appl. No. 16/442,015, filed Jun. 14, 2019, Notice of Allowance, dated Jan. 14, 2021.

* cited by examiner

EVALJOINORDER($O$, $O_{best}$, $best\_cost$)
▷ Input:       $O$ - Permutation of tables
▷ In/Output:   $O_{best}$ - Best Join Permutation found so far
▷ In/Output:   $best\_cost$ - Cost of best plan found so far 1  $outer \leftarrow O[0]$           ▷ outer represents a set of tables
2  $inner \leftarrow O[1]$           ▷ inner represents a set of tables
3  for $i \leftarrow 2..|O| - 1$
4     $\bowtie \leftarrow inner \bowtie outer$
5     if ISFEASIBLE($\bowtie$)
6        $inner.cost\_of\_fload \leftarrow$ CONVERTCOST(COST($\bowtie_{of\,fload}$)) +
            $outer.cost\_of\_fload + inner.cost\_of\_fload$
7     else $inner.cost\_of\_fload \leftarrow \infty$
8     $cost \leftarrow min($COST($\bowtie_{NLJ}$), COST($\bowtie_{SMJ}$), COST($\bowtie_{HJ}$),
            COST($\bowtie$)) $+ outer.cost + inner.cost$
9     $cost \leftarrow min(cost, inner.cost\_of\_fload)$
10    $inner.cost \leftarrow cost$
11    if $cost > best\_cost$
12       return
13    $outer \leftarrow inner$
14    $inner \leftarrow O[i]$
15 if $cost < best\_cost$
16    $O_{best} \leftarrow O$
17    $best\_cost \leftarrow cost$

INFLUENCING PLAN GENERATION IN THE CONTEXT OF THE TWO PHASE QUERY OPTIMIZATION APPROACH

FIELD OF THE INVENTION

The present invention relates to optimizing execution of queries.

BACKGROUND

Relational and object-relational database management systems store information in tables of rows. To retrieve data, queries that request data are submitted to a database server, which computes the queries and returns the data requested.

Queries submitted to a database server in a relational database management system (RDBMS) must conform to the syntactical rules of a particular query language. One popular query language, known as the Structured Query Language (SQL), provides users a variety of ways to specify information to be retrieved.

Queries submitted to an RDBMS are evaluated by a query optimizer. Based on the evaluation, the query optimizer generates a query execution plan (QEP) that defines steps for executing the query. Typically, the query optimizer generates a QEP optimized for efficient execution.

In order to accelerate query execution performance, an RDBMS may be connected to a query offload engine, where parts of the QEP can be offloaded to. In this scenario, the query optimizer of the RDBMS evaluates queries and hands over responsibility to the query optimizer of the offload engine for parts of the QEP that are assigned to run on the offload engine. This approach is referred to herein as the 'Two Phase Query Optimization Approach'.

To determine which parts of the QEP to assign to the offload engine, the query optimizer of the RDBMS generates multiple QEP alternatives, costs each QEP alternative for the RDBMS and offload engine, compares the costs of each QEP alternative for the RDBMS and offload engine, and selects the cheapest QEP alternative to execute on the RDBMS or offload engine.

Because the query execution engine of the RDBMS and the offload engine are based on inherently different execution architectures, the RDBMS query optimizer applies an algorithm to convert offload engine costs to RDBMS costs. However, due to architectural differences between RDBMSs and offload engines, cost conversion algorithms are not always accurate for every usage scenario. Thus, there are a variety of scenarios where it is desirable and more cost efficient to perform execution in the offload engine, even if a cost conversion algorithm does not indicate as such.

Based on the foregoing, there is a clear need for developing techniques that facilitate influencing a plan selection algorithm in favor of an offload engine execution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for influencing plan generation in context of the two phase query optimization approach.

Types of pruning criteria exist in cost-based plan generators to determine what parts of a query statement should be offloaded to a query offload engine. Method pruning criteria is responsible to determine an optimal joining method. Total cost pruning criteria compares accumulated costs with a lowest plan cost determined so far. Permutation pruning criteria is responsible for selecting the cheapest query execution plan from all considered query execution plans. Each type of pruning criteria is modified to favor offload engine execution upon request.

For example, in context of the two phase query optimization approach, method pruning criteria can be modified to favor offloading by making the following changes: If a join operator is feasible, always choose offload engine execution over RDBMS execution by marking the join operator to be offloaded; If a join operator is feasible for offload engine execution and offload engines cost are lower than RDBMS cost, RDBMS costs are set to offload engines costs; If a join operator is feasible for offload engine execution and offload engines cost are higher, then offload engines cost are set to RDBMS cost; If a join operator is not feasible for offload engine execution, do not change any behavior, i.e. use the lowest RDBMS cost for that join operator and do not mark it for offload.

Permutation pruning criteria can be modified to favor offloading by making the following changes: count the number of offloaded join operators in current plan and compare it to the number of join operators marked with offload in the best plan determined so far and choose the plan that has the highest number of join operators to be offloaded. In case both plans have the same number of join operators, keep the plan with the lowest costs.

Total cost pruning criteria can be modified to favor offloading by disabling the total cost pruning criteria.

By making such modifications, a cost based plan generator can be influenced to favor offload execution of query statements.

Illustrative Operational Environment

Figure 1:
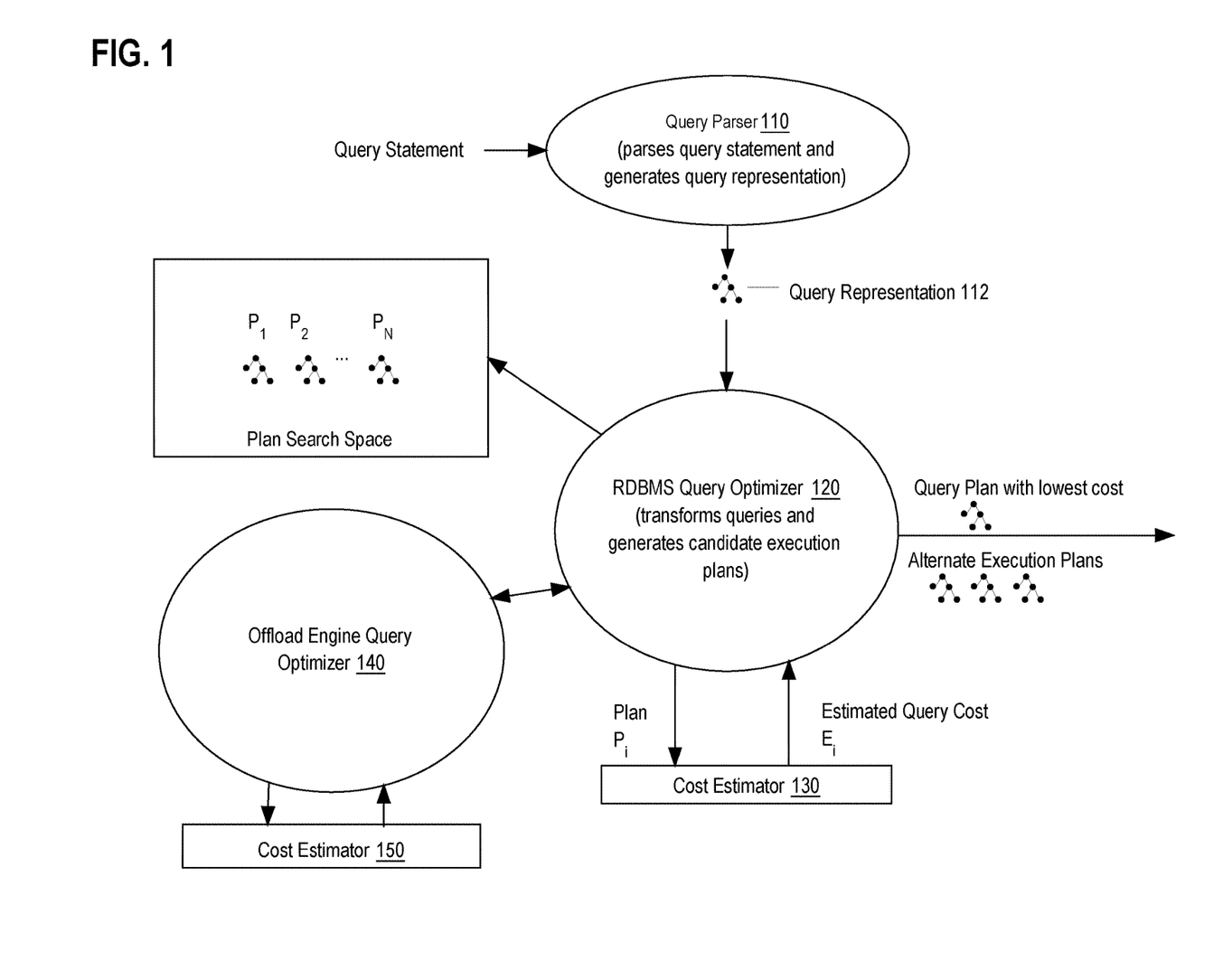
FIG. 1 is a diagram depicting a query optimizer and related components within a RDBMS.

FIG. 1 is a diagram depicting a query optimizer and related components within a RDBMS. Query parser 110 receives a query statement and generates an internal query representation 112 of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by RDBMS query optimizer 120.

RDBMS query optimizer 120 generates one or more different candidate execution plans for a query, which are evaluated by RDBMS query optimizer 120 to determine which should be used to compute the query. The one or more candidate execution plans that are evaluated for this purpose are collectively referred to as the plan search space or search space. For a given query, a search space may include candidate execution plans $P_1$, $P_2$ through $P_N$.

Execution plans may be represented by a graph of interlinked nodes, referred to herein as operators, that each correspond to a step of an execution plan, referred to herein as an execution plan operation. The hierarchy of the graphs represents the order in which the execution plan operations are performed and how data flows between each of the execution plan operations. Execution plan operations include, for example, a table scan, an index scan, hash-join, sort-merge join, nested-loop join, and filter.

To evaluate the candidate execution plans in the search space, RDBMS query optimizer 120 estimates a cost of each candidate execution plan and compares the estimated query costs to select an execution plan for execution. In an embodiment, the estimated query cost is generated by a query cost estimator 130, which may be a component of RDBMS query optimizer 120. For a plan $P_i$ supplied by RDBMS query optimizer 120, cost estimator 130 computes and generates an estimated query cost $E_i$. In general, the estimated query cost represents an estimate of computer resources expended to execute an execution plan with the lowest estimated cost. To perform alternate plan analysis, RDBMS query optimizer 120 may select multiple candidates for execution. Each of the selected candidates is referred to herein as an alternate execution plan.

In some embodiments, RDBMS query optimizer 120 is connected to an offload engine query optimizer 140 of an offload engine. An example of an offload engine is described in U.S. patent application Ser. No. 14/673,560 MULTI-SYSTEM QUERY EXECUTION PLAN filed Mar. 30, 2015 by Khai Tran et al., the contents of which are incorporated in entirety. Specifically, the second DBMS and primary DBMS described therein are example of offload engine and RDBMS.

Offload engine query optimizer 140 may include a cost estimator 150 to estimate a cost of each candidate execution plan supplied by RDBMS query optimizer 120. Cost estimator 150 may function similarly to cost estimator 130, except that cost estimator 150 computes and generates estimated query costs of running queries on a corresponding offload engine, which may be architecturally different from an RDBMS associated with RDBMS query optimizer 120. RDBMS Query Optimizer 120 may compare costs of running candidate execution plans from the plan search space on the offload engine and the RDBMS when deciding which candidate execution plan to select and where to execute the selected candidate execution plan.

Query optimizer 120 may optimize a query by transforming the query. In general, transforming a query involves rewriting a query into another query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

The query as transformed is referred to herein as the transformed query. The query is rewritten by manipulating a copy of the query representation to form a transformed query representation representing a transformed query.

One or more alternate transformations may be performed, and for each alternate transformation, one or more candidate execution plans are generated. Thus, a search space may contain candidate execution plans for multiple transformations, and multiple candidate execution plans for a single query transformation.

Two Phase Query Optimization

While processing a query, a query optimizer such as RDBMS query optimizer 120 goes through several phases in order to construct a query execution plan. The phases include: (1) Parsing (2) Semantic Analysis, Normalization, Factorization, Constant Folding and Translation (3) Rewrite Phase I (4) Plan Generation (5) Rewrite Phase II, and (6) Code Generation.

In the Two Phase Query Optimization Approach, the offload engine query optimizer 140 is utilized during the plan generation phase by supplying access to the cost estimator 150 of the offload engine query optimizer 140, and is also utilized during the code generation phase, where the offload engine query optimizer 140 is invoked to generate a (sub)QEP suitable for running on the corresponding offload engine. The generated (sub)QEP then substitutes a fragment of the RDBMS's QEP and is glued in through a transition operator.

To determine the size and shape of a plan fragment of the RDBMS's QEP that should run in the offload engine, the RDBMS query optimizer 120 generates multiple QEP alternatives, costs each QEP alternative for the RDBMS and offload engine, compares the costs of each QEP alternative for the RDBMS and offload engine, and selects the cheapest QEP alternative to execute on the RDBMS or offload engine.

Execution alternatives of the offload engine are only considered if feasible for offloading. To be considered feasible, execution alternatives must meet at least one of the following three conditions:

1. The offload engine provides an operator implementation for the current planned operator.

2. The direct dependencies are feasible. Direct dependencies refer to the inputs (e.g. tables) of the current operator. By implication also all indirect, transitive dependencies have to be feasible which includes all base table accesses.

3. Base table access are considered feasible if the base table is loaded into the offload engine. This condition requires the data of the RDBMS base table is copied into the offload engine.

Once an operator is considered feasible the whole underlying (sub)plan, i.e. the (sub)plan includes the operator and the (sub)plan(s) that are input to the operator, can be considered for execution in the offload engine. This is achieved by cost estimating the new plan and comparing it to the cheapest alternative found so far.

Cost Based Plan Generation

Figure 2:
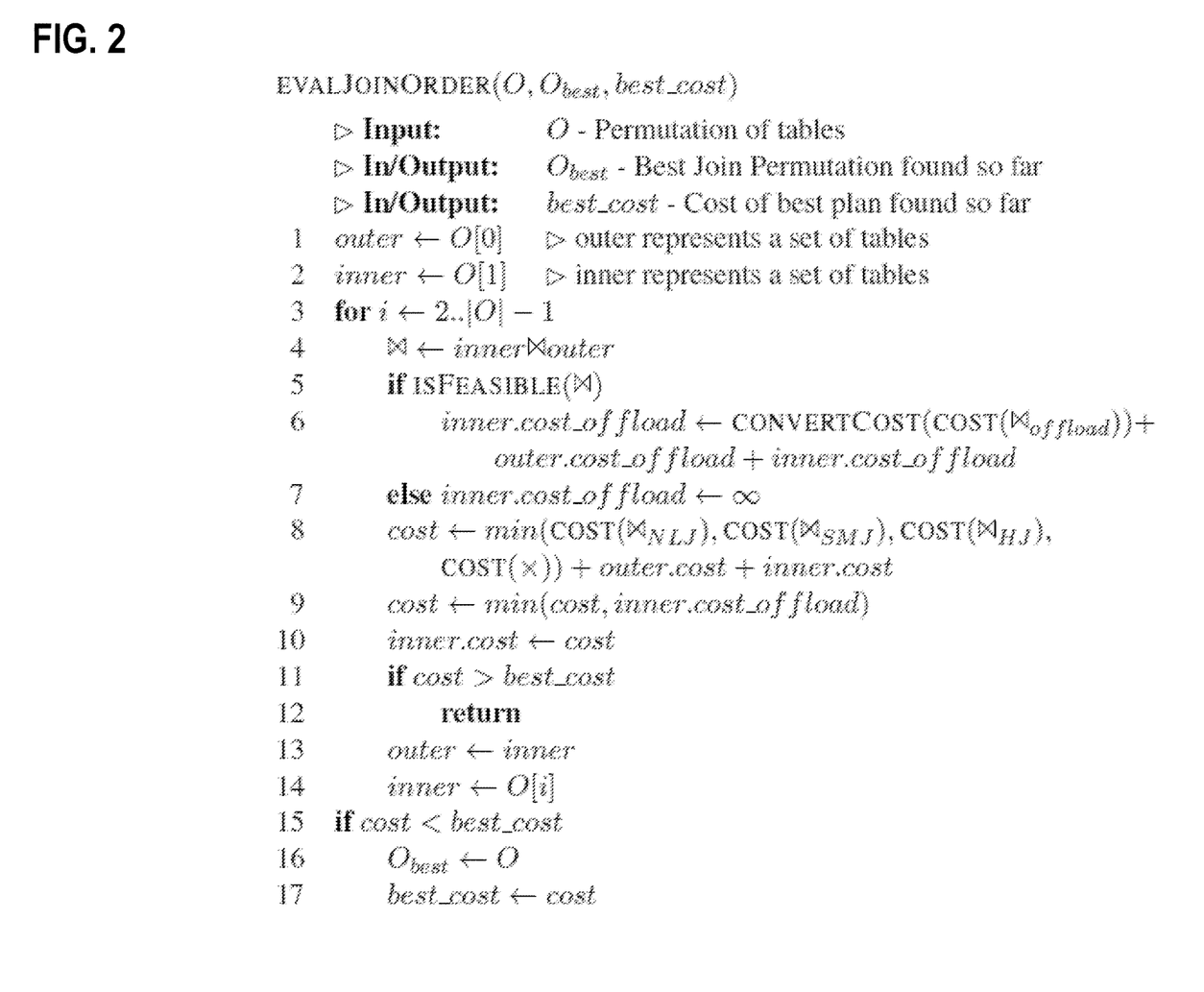
FIG. 2 is an illustration of a cost-based plan selection algorithm.

During the plan generation phase, the RDBMS query optimizer performs cost-based plan selection. In an embodiment, the plan generator is permutation-based. A permutation can be defined as a sequence of tables. Given a permutation, the cost-based plan selection algorithm as shown in FIG. 2 generates and costs a QEP and compares it with previously generated QEPs. The QEP that is generated in FIG. 2 corresponds to a left-deep join tree. By considering all possible permutations of a given list of tables and calling 'EVALJOINORDER' for each possible permutation, the cheapest left-deep plan can be determined.

As shown in FIG. 2, 'Input' is a permutation 'O', that represents a sequence of tables to be joined. FIG. 2 includes two references to 'In/Output': (1) A particular permutation of tables 'O-best' that has the lowest execution costs and (2) 'best_cost' that indicates the cost of the best plan, as so far determined. In Lines 1 and 2 the inputs to the first join, i.e. 'outer' and 'inner', are set by initializing 'outer' (left table) and 'inner' (right table). Each iteration of the loop in Lines 3 to 14 of FIG. 2 performs the following steps:

At Line 4, the loop assigns a new join operator.

At Line 5, the loop checks if the join operator is feasible for offload engine execution. The function 'ISFEASIBLE' also checks the feasibility of the inputs to the join operator.

At Line 6, if the new operator is feasible, an accumulated offload cost is calculated for the new operator. Three cost components are considered: (1) and (2) are the costs of each input, e.g. 'outer.cost_offload' and 'inner.cost_offload'. The cost of each input is determined in previous iterations of the loop, or is pre-initialized for base table accesses, before the first call to 'EVALJOINORDER' occurs. The cost component (3) is the operator cost. The operator cost is converted to the RDBMS cost model by calling a 'CONVERTCOST' function. The offload engine costs are assigned to the 'inner.cost_offload' field, which can be recalled during later iterations.

At Line 7, if the join operator or inputs to the join operator are not feasible as determined by Line 5, the offload cost, e.g. 'inner.cost_offload', is set to an inflated or infinite cost which assures that a plan will not be offloaded.

At Line 8, an accumulated cost for executing the operator in the RDBMS is calculated. Three cost components are considered: (1) and (2) are the costs of each input, e.g. 'outer.cost' and 'inner.cost', and (3) is the cost of the cheapest join operator. Outer.cost reflects accumulated offload cost for the previous iteration, if any, if a decision was made to place execution of the operation considered in the previous iteration to the offload engine.

At Line 9, an offload placement decision is determined for the operator considered during the current loop iteration by identifying the lower cost between the accumulated offload cost and RDBMS cost.

At Line 11, in the case that the cost determined in Line 9 exceeds the best cost determined in all loop iterations so far, the permutation of the current loop iteration cannot lead to the cheapest plan and does not need to be considered any further.

At Lines 13 and 14, the new outer and inner are set for the next loop iteration. As a result, outer.cost reflects the cost for the current and any previous placement decisions. Outer.cost_offload reflects the cost of offload cost determined for this and previous iterations. If the current loop iteration is the last loop iteration, this step will not have any effect. By setting the new outer to the current inner, the whole intermediate result of the current operator is considered. When determining the predicate for the next operator, all tables considered so far are checked for possible references and not only the current inner one. Thus, the new outer will subsume all table references in the range of O[0]::O[i].

At Lines 15-17, if the cost of the permutation of the current loop iteration is lower than the previous lowest cost, the current best permutation and best_cost is overwritten.

Influencing Query Offloading

As discussed above, due to architectural differences of two different execution engines, the Two Phase Query Optimization Approach is required to reconcile two different cost models where cost conversion and cost adjustment between models can be difficult and inaccurate.

There are several scenarios where a database user wants to influence the offload decision in favor of query offloading. For example, the RDBMS cost model is often biased in favor of parallel execution. This disfavors offload engine execution and can cause queries to be executed on an RDBMS when more efficient execution can be achieved by offloading. Additionally, for comparing performance between the offload engine and the RDBMS, two QEPs are of interest: (1) The pure RDBMS plan, where the execution in the offload engine is disabled and (2) a plan where all feasible operators are to be executed in the offload engine. Without a way to influence query offloading, testing, debugging, and plan analysis become difficult.

In the Two Phase Query Optimization Approach, the RDBMS plan generator is the component responsible for making the offload decision. The existing cost-based selection criteria of the RDBMS plan generator can be modified to favor offload engine execution upon request of a client. To trigger this behavior, a query hint or a database session setting can be implemented in an RDBMS.

To begin influencing plan generation, it can be observed that there are several categories of pruning criteria that are at work in cost-based plan generators such as the one presented in FIG. 2. A first category of pruning criteria is method pruning. Method pruning is responsible to determine the optimal joining method. In FIG. 2, method pruning occurs in Lines 8 and 9. Whereas Line 8 determines the cheapest join method for RDBMS operators, Line 9 implements the offload decision. A second category of pruning criteria is total cost pruning. Total cost pruning compares the accumulated costs with the lowest plan cost determined so far. As depicted in FIG. 2, this takes place in Lines 11 and 12. A third category of pruning criteria permutation pruning. Permutation pruning is responsible for selecting the cheapest plan from all considered plans. Permutation Pruning is achieved in Lines 15 to 17 of FIG. 2.

To influence the offload decision, the method pruning criteria can be modified as follows:

If operator is feasible, always choose offload engine execution over RDBMS execution by marking it to be offloaded.

In case operator is feasible for offload engine execution and offload engines cost are lower than RDBMS cost, RDBMS costs are set to offload engines costs.

In case operator is feasible for offload engine execution and offload engines cost are higher, then offload engines cost are set to RDBMS cost.

In case operator is not feasible for offload engine execution, don't change any behavior, i.e. use the lowest RDBMS cost for that operator and do not mark it for offload.

The permutation pruning criteria can be modified to select a plan based on priorities:

Priority 1: count the number of offloaded operators in current plan 'O' and compare to the number operators marked with offload in the best plan determined so far 'O-best'. Choose the plan that has the highest number of operators to be offloaded.

Priority 2: In case both plans 'O' and 'O-best' have the same number of operators, keep the plan with the lowest costs.

The total cost pruning criteria can be modified by disabling the total cost pruning criteria.

Example Procedure

Figure 3:
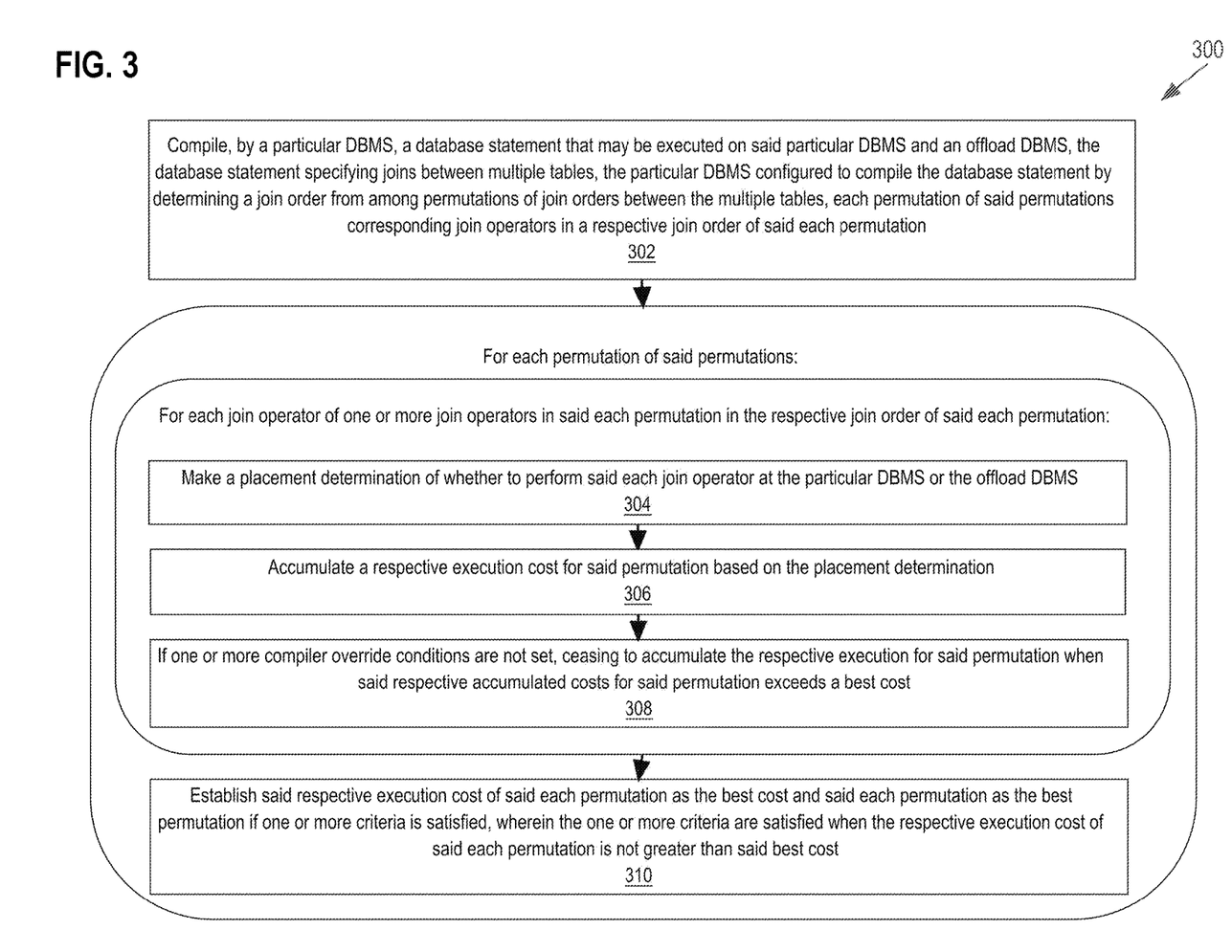
FIG. 3 is a flow diagram that depicts influencing cost-based plan selection.

FIG. 3 is a flow diagram that depicts influencing cost-based plan selection performed by RDBMS query optimizer 120, in an embodiment. FIG. 3 is discussed with reference to FIG. 1 and also FIG. 2.

At step 302, a primary DBMS compiles a database statement that may be executed on said primary DBMS and an offload DBMS. The database statement specifies joins between multiple tables. The primary DBMS is configured to compile the database statement by determining a join order from among permutations of join orders between the multiple tables, each permutation of the permutations corresponding join operators in a respective join order of each permutation. For example, RDBMS query optimizer 120 from FIG. 1 may compile the database statement. The database statement may include joins between tables. The RDBMS query optimizer 120 may be permutation based. A permutation is defined as a sequence of tables and may include join operators in specific join orders between multiple tables that are specified in the database statement.

In steps 304-310 a join order is determined. Steps 304-310 are performed for each permutation of said permutations. As part of determining a join order, steps 304-308 are performed for each join operator of one or more join operators in each permutation in the respective join order of each permutation.

At step 304, a placement determination of whether to perform each join operator at the primary DBMS or the offload DBMS is made. For example, this step corresponds to line 9 from FIG. 2, as discussed in detail with respect to FIG. 2.

At step 306, a respective execution cost for the permutation is accumulated based on the placement determination. For example, an offload DBMS execution cost for the current permutation is determined in line 6 of FIG. 2. A DBMS execution cost for the current permutation is determined in line 8 of FIG. 2. Based on the placement determination made in step 304, the respective execution cost for the permutation is accumulated and stored.

At step 308, if one or more compiler override conditions are not set, the accumulation of the respective execution for the permutation is ceased when the respective accumulated costs for the permutation exceeds a best cost. A compiler override condition may comprise a query hint in the database statement or an activation of a database session setting in the particular RDBMS. For example, this step corresponds to lines 11 and 12 (total cost pruning criteria) from FIG. 2, as discussed in detail with respect to FIG. 2.

In one embodiment, if the one or more compiler override conditions are set when compiling the database statement, compiling the database statement includes generating an execution plan for the database statement that has a particular join order of the permutations. For example, if the one or more compiler override conditions are set, lines 11 and 12 (total cost pruning criteria) are removed or deactivated from FIG. 2.

In one embodiment, the compiler override specifies to select a permutation having a best cost among one or more permutations of the permutations that are marked with a highest number of offloaded join operators. For example, if the one or more compiler override conditions are set, lines 15-17 (permutation pruning criteria) of FIG. 2 are modified to select a permutation having a best cost among one or more permutations of the permutations that are marked with a highest number of offloaded join operators.

In one embodiment, enforcing priority 1 of the permutation pruning criteria includes determining that a particular permutation of the permutations that has a highest number of join operators determined to be performed at the offload DBMS of the permutations. The database statement may be compiled by generating an execution plan for the database statement that has a particular join order of the particular permutation.

In one embodiment, enforcing priority 2 of the permutation pruning criteria includes determining that one or more permutations that are marked with a highest number of offloaded join operators. A permutation with a best accumulated cost is selected from the one or more permutations that are marked with the highest number of offloaded join operators. The database statement may be compiled by generating an execution plan for said database statement that has a particular join order of the permutation with the best accumulated cost.

In one embodiment, making a placement determination of whether to perform each join operator at the primary DBMS or the offload DBMS includes accumulating a DBMS execution cost and an offload DBMS execution cost for the permutation. For example, an offload DBMS execution cost for the current permutation is determined in line 6 of FIG. 2. A DBMS execution cost for the current permutation is determined in line 8 of FIG. 2.

In one embodiment, the compiler override specifies to: make a placement determination to perform each join operator at the offload DBMS in response to determining that each join operator is feasible, set the DBMS execution cost to the offload DBMS execution cost in response to determining that each join operator is feasible and that the offload DBMS execution cost is lower than the DBMS execution cost, set the offload DBMS execution cost to the DBMS execution cost in response to: determining that each join operator is feasible and that the offload DBMS execution cost is higher than the DBMS execution cost, and make a placement determination to perform each join operator at the primary DBMS in response to determining that each join operator is not feasible. For example, if the one or more compiler override conditions are set, lines 8-9 (method pruning criteria) of FIG. 2 are modified as discussed above to perform the desired behavior.

At step 310, the respective execution cost of each permutation is established as the best cost and each permutation is established as the best permutation if one or more criteria is satisfied. The one or more criteria are satisfied when the respective execution cost of each permutation is not greater than said best cost.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing Overview

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation.

Query Optimization Overview

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e. one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

Multi-Node Database Management System

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Software Overview

Figure 4:
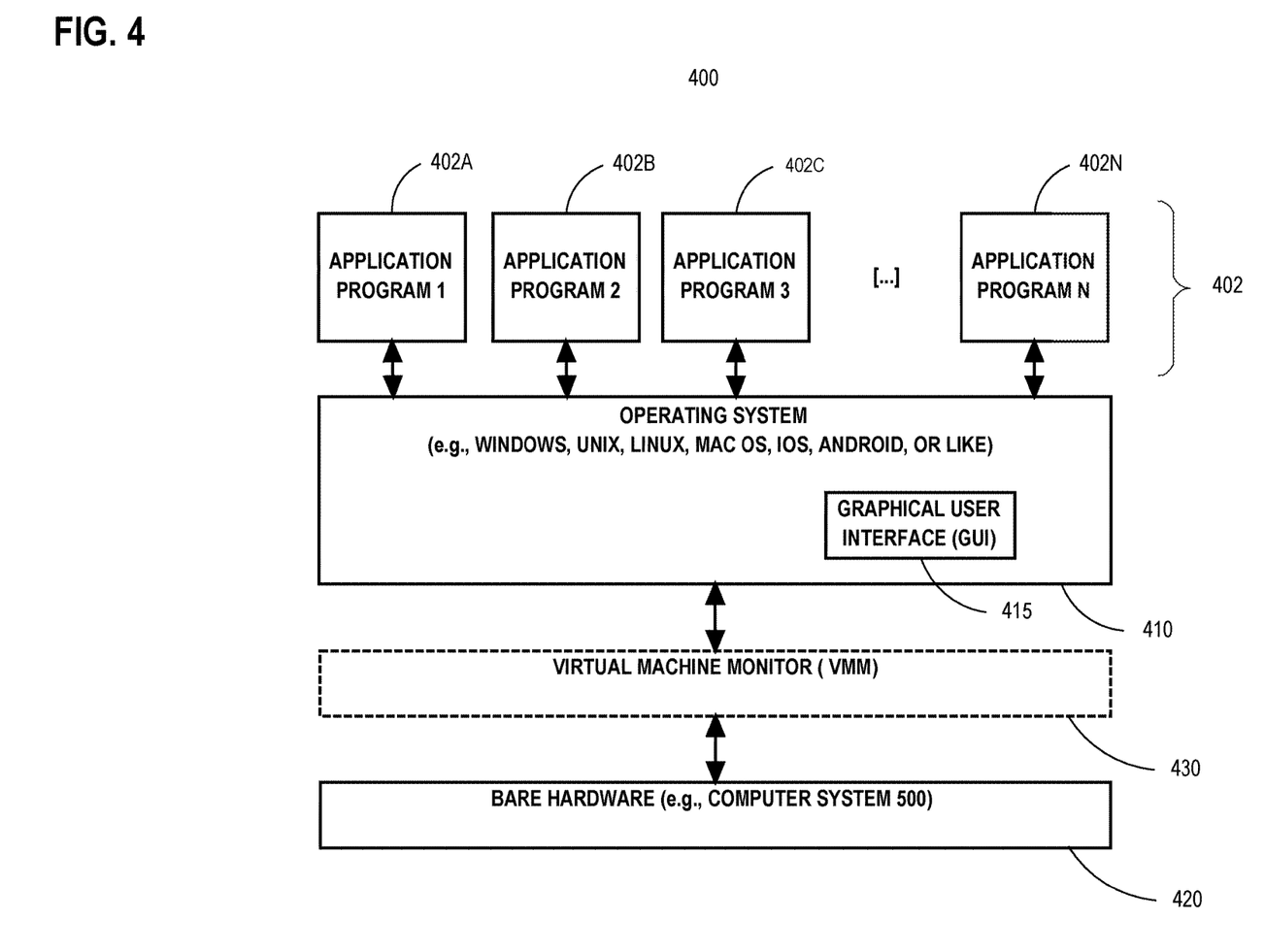
FIG. 4 is a diagram depicting a software system that may be used in an embodiment.
Figure 5:
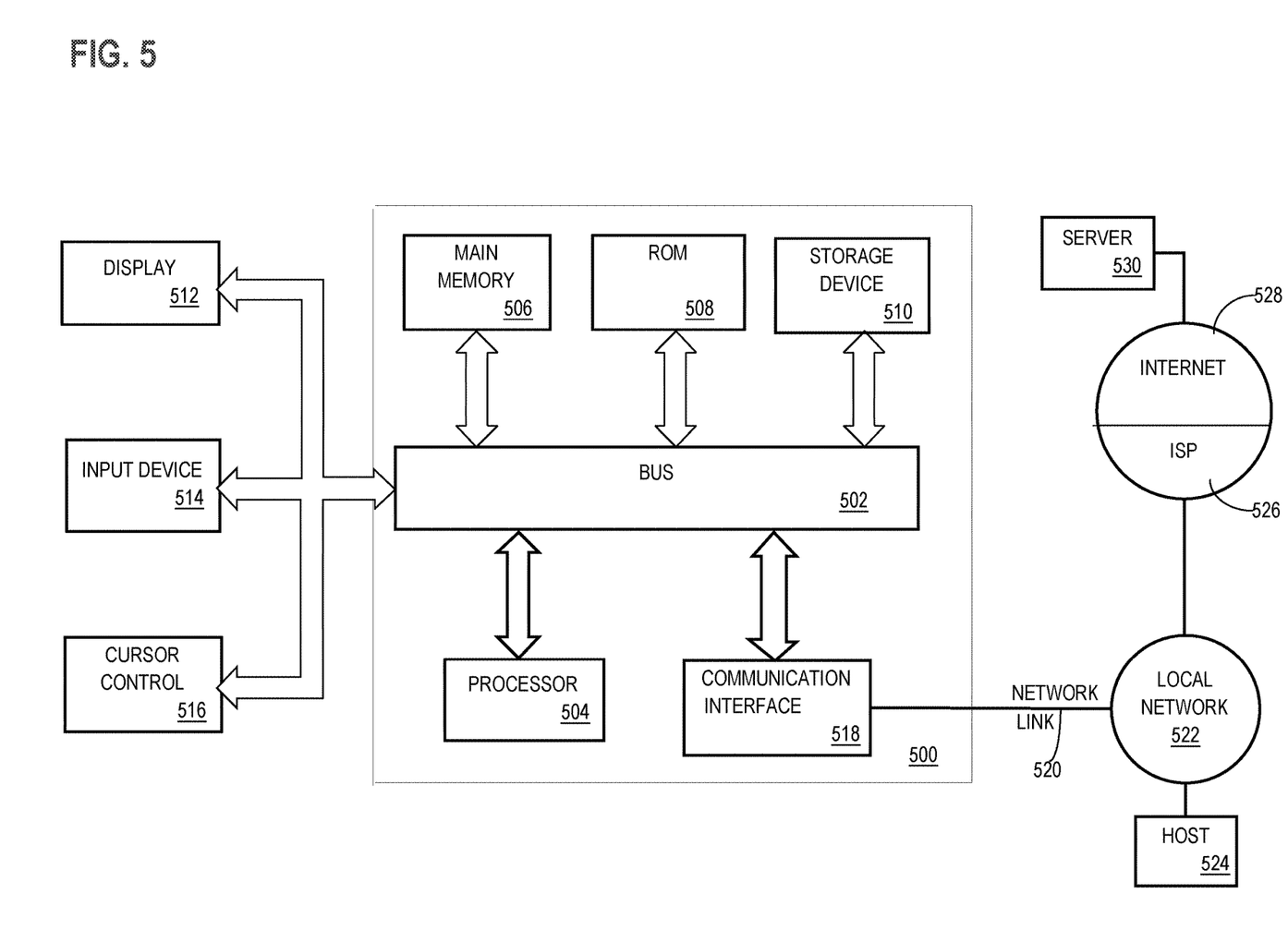
FIG. 5 is a diagram depicting a computer system that may be used in an embodiment.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system (OS) to run as if the guest OS is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 702. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a primary DBMS compiling a database statement that is executable on said primary DBMS and an offload DBMS, wherein said database statement specifies joins between multiple tables;
   wherein said primary DBMS compiling said database statement includes determining a particular join order from among permutations of join orders between said multiple tables, each permutation of said permutations corresponding to join operators in a respective join order of said each permutation;
   wherein determining said particular join order includes:
      for each permutation of said permutations:
         for each join operator of the join operators in the respective join order of said permutation:
            updating an accumulated offload cost that reflects an offload cost of performing said each join operator on the said offload DBMS,
            determining a primary-DBMS cost based on a cost of executing said each join operator on the primary DBMS and an accumulated placement-based cost,
            based on a minimum of the accumulated offload cost and said primary-DBMS cost, updating the accumulated placement-based cost,
            making a placement determination of whether to perform said each join operator at the primary DBMS or the offload DBMS by at least placing said each join operator for execution in said offload DBMS whenever execution of said each join operator on said offload DBMS is feasible;
         whenever a number of join operations placed at the offload DBMS for said each permutation is not less than any number of join operations placed at the offload DBMS for any other permutation of said permutations, updating a best cost and a best permutation based on the accumulated placement-based cost.

2. The method of claim 1, further including, for a particular permutation of said permutations, updating the best cost and the best permutation whenever a number of join operations placed at the offload DBMS for said particular permutation is not less than any number of join operations placed at the offload DBMS for any other permutation of said permutations and that for any other permutation of said permutations having an equal number of join operations placed at the offload DBMS, the accumulated placement-based cost associated with said other permutation is not less than an accumulated placement-based cost associated with said particular permutation.

3. The method of claim 1, wherein for each permutation of said permutations and for each join operator of one or more join operators in said each permutation of said permutations, the updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

4. The method of claim 1, wherein for each permutation of said permutations and for each join operator of one or more join operators in said each permutation of said permutations, the updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

5. A method comprising:
a primary DBMS compiling a database statement that is executable on said primary DBMS and an offload DBMS, wherein said database statement specifies joins between multiple tables;
wherein said primary DBMS compiling said database statement, includes determining a particular join order from among permutations of join orders between said multiple tables, each permutation of said permutations corresponding to join operators in a respective join order of said each permutation;
wherein the determining said particular join order includes:
for each permutation of said permutations:
for each join operator of the join operators in the respective join order of said each permutation:
updating an accumulated offload cost that reflects an offload cost of performing said each join operator on the said offload DBMS,
determining a primary-DBMS cost based on a cost of executing said each join operator on the primary DBMS and an accumulated placement-based cost,
based on a minimum of the accumulated offload cost and said primary-DBMS cost, updating the accumulated placement-based cost and making a placement determination of whether to perform said each join operator at the primary DBMS or the offload DBMS, and
when one or more compiler override criteria are not satisfied, ceasing determining any accumulated cost of said each permutation when said accumulated placement-based cost exceeds a best cost;
based on one or more permutation selection criteria, updating the best cost and a best permutation based on the accumulated placement-based cost.

6. The method of claim 5, wherein for a particular permutation of said permutations, said one or more permutation selection criteria includes an accumulated placement-based cost associated with said particular permutation that is less than a best cost.

7. The method of claim 5, wherein for a particular permutation of said permutations, said one or more permutation selection criteria include a number of join operations placed at the offload DBMS for said particular permutation that is not less than any number of join operations placed at the offload DBMS for any other permutation of said permutations.

8. The method of claim 5, wherein for a particular permutation of said permutations, said one or more permutation selection criteria include a number of join operations placed at the offload DBMS for said particular permutation that is not less than any number of join operations placed at the offload DBMS for any other permutation of said permutations and that for any other permutation of said permutations having an equal number of join operations placed at the offload DBMS, the accumulated placement-based cost associated with said other permutation is not less than an accumulated placement-based cost associated with said particular permutation.

9. The method of claim 5, wherein for each permutation of said permutations and for each join operator of one or more join operators in said each permutation of said permutations, updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

10. The method of claim 5, wherein for each permutation of said permutations and for each join operator of one or more join operators in said each permutation of said permutations, updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

11. One or more non-transitory computer-readable media storing instructions which, when executed by one or more processors, cause:
a primary DBMS compiling a database statement that is executable on said primary DBMS and an offload DBMS, wherein said database statement specifies joins between multiple tables;

wherein said primary DBMS compiling said database statement, includes determining a particular join order from among permutations of join orders between said multiple tables, each permutation of said permutations corresponding to join operators in a respective join order of said each permutation;

wherein determining said particular join order includes:
  for each permutation of said permutations:
    for each join operator of the join operators in the respective join order of said each permutation:
      updating an accumulated offload cost that reflects an offload cost of performing said each join operator on the said offload DBMS,
      determining a primary-DBMS cost based on a cost of executing said each join operator on the primary DBMS and an accumulated placement-based cost,
      based on a minimum of the accumulated offload cost and said primary-DBMS cost, updating the accumulated placement-based cost,
      making a placement determination of whether to perform said each join operator at the primary DBMS or the offload DBMS by at least placing said each join operator for execution in said offload DBMS whenever execution of said each join operator on said offload DBMS is feasible;
    whenever a number of join operations placed at the offload DBMS for said each permutation is not less than any number of join operations placed at the offload DBMS for any other permutation of said permutations, updating a best cost and a best permutation based on the accumulated placement-based cost.

12. The one or more non-transitory computer-readable media of claim 11, further comprising instructions which, when executed by the one or more processors, cause: for a particular permutation of said permutations, updating the best cost and the best permutation whenever a number of join operations placed at the offload DBMS for said particular permutation is not less than any number of join operations placed at the offload DBMS for any other permutation of said permutations and that for any other permutation of said permutations having an equal number of join operations placed at the offload DBMS, the accumulated placement-based cost associated with said other permutation is not less than an accumulated placement-based cost associated with said particular permutation.

13. The one or more non-transitory computer-readable media of claim 11, wherein for each permutation of said permutations and for each join operator of one or more join operators in said each permutation of said permutations, the updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

14. The one or more non-transitory computer-readable media of claim 11, wherein for each permutation of said permutations and for each join operator of one or more join operators in said each permutation of said permutations, the updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

15. One or more non-transitory computer-readable media storing instructions which, when executed by one or more processors, cause:
  a primary DBMS compiling a database statement that is executable on said primary DBMS and an offload DBMS, wherein said database statement specifies joins between multiple tables;
  wherein said primary DBMS compiling said database statement, includes determining a particular join order from among permutations of join orders between said multiple tables, each permutation of said permutations corresponding to join operators in a respective join order of said each permutation;
  wherein the determining said particular join order includes:
    for each permutation of said permutations:
      for each join operator of the join operators in the respective join order of said each permutation:
        updating an accumulated offload cost that reflects an offload cost of performing said each join operator on the said offload DBMS,
        determining a primary-DBMS cost based on a cost of executing said each join operator on the primary DBMS and an accumulated placement-based cost,
        based on a minimum of the accumulated offload cost and said primary-DBMS cost, updating the accumulated placement-based cost and making a placement determination of whether to perform said each join operator at the primary DBMS or the offload DBMS, and
        when one or more compiler override criteria are not satisfied, ceasing determining any accumulated cost of said each permutation when said accumulated placement-based cost exceeds a best cost;
      based on one or more permutation selection criteria, updating the best cost and a best permutation based on the accumulated placement-based cost.

16. The one or more non-transitory computer-readable media of claim 15, wherein for a particular permutation of said permutations, said one or more permutation selection criteria includes an accumulated placement-based cost associated with said particular permutation that is less than a best cost.

17. The one or more non-transitory computer-readable media of claim 15, wherein for a particular permutation of said permutations, said one or more permutation selection criteria include a number of join operations placed at the offload DBMS for said particular permutation that is not less than any number of join operations placed at the offload DBMS for any other permutation of said permutations.

18. The one or more non-transitory computer-readable media of claim 15, wherein for a particular permutation of said permutations, said one or more permutation selection criteria include a number of join operations placed at the offload DBMS for said particular permutation that is not less than any number of join operations placed at the offload DBMS for any other permutation of said permutations and that for any other permutation of said permutations having an equal number of join operations placed at the offload DBMS, the accumulated placement-based cost associated with said other permutation is not less than an accumulated placement-based cost associated with said particular permutation.

19. The one or more non-transitory computer-readable media of claim 15, wherein for each permutation of said permutations and for each join operator of one or more join operators in said each permutation of said permutations, updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

20. The one or more non-transitory computer-readable media of claim 15, wherein for each permutation of said permutations and for each join operator of one or more join operators in said each permutation of said permutations, updating the accumulated offload cost that reflects an offload cost of performing said each join operation on said offload DBMS includes, when the offload cost of performing said each join operation is higher than the cost of executing said each join operator on the primary DBMS, using the cost of executing said each join operator on the primary DBMS instead of the offload cost of performing said each join operation on said offload DBMS to update said accumulated offload cost.

* * * * *

UNITED STATES PATENT AND TRADEMARK OFFICE
CERTIFICATE OF CORRECTION

| | | |
|---|---|---|
| PATENT NO. | : 11,061,901 B2 | Page 1 of 1 |
| APPLICATION NO. | : 16/519794 | |
| DATED | : July 13, 2021 | |
| INVENTOR(S) | : Fender et al. | |

It is certified that error appears in the above-identified patent and that said Letters Patent is hereby corrected as shown below:

In the Specification

In Column 15, Line 51, delete "702." and insert -- 502. --, therefor.

In the Claims

In Column 16, Line 47, in Claim 1, after "said" insert -- each --.

In Column 17, Line 47, in Claim 5, delete "statement," and insert -- statement --, therefor.

In Column 19, Line 2, in Claim 11, delete "statement," and insert -- statement --, therefor.

In Column 20, Line 15, in Claim 15, delete "statement," and insert -- statement --, therefor.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*